3,474,124
N,2,6-TRIMETHOXY-3-CHLOROBENZAMIDE

Jordan P. Berliner, Des Plaines, and Sidney B. Richter, Chicago, Ill., assignors to Velsicol Chemical Corporation, Chicago, Ill., a corporation of Illinois
No Drawing. Filed Apr. 5, 1967, Ser. No. 628,563
Int. Cl. A01n *9/20;* C07c *103/26, 119/20*
U.S. Cl. 260—453                           1 Claim

ABSTRACT OF THE DISCLOSURE

N,2,6-trimethoxy-3-chlorobenzamide, useful for controlling acarids.

---

This invention relates to the new chemical composition, N,2,6-trimethoxy-3-chlorobenzamide, having the following structural formula:

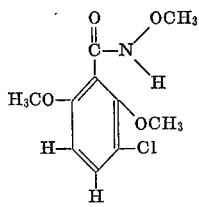

The compound of the present invention is unexpectedly effective as a pesticide, particularly as an acaricide.

The manner in which the new compound of the present invention can be prepared is illustrated in the following examples.

EXAMPLE 1

Preparation of N,2,6-trimethoxy-3-chlorobenzoyl chloride 2,6-dimethoxy-3-chlorobenzoic acid (5.9 grams; 0.027 mole), toluene (12 ml.) and thionyl chloride (2.2 ml.; 0.030 mole) were charged into a 50 ml. glass reaction flask equipped with a reflux condenser with drying tube. The mixture was heated at reflux with continuous stirring for about 7 hours. After this time the reaction mixture was treated with activated charcoal and filtered. The filtrate was distilled under aspirator pressure to remove the toluene and excess thionyl chloride to give 2,6-dimethoxy-3-chlorobenzoyl chloride as the residue.

EXAMPLE 2

Preparation of N,2,6-trimethoxy-3-chlorobenzamide

Potassium carbonate (2.6 grams; 0.019 mole), methoxyamine hydrochloride (1.4 grams; 0.017 mole), and benzene (50 ml.) were placed in a 300 ml. glass reaction flask equipped with stirrer, reflux condenser and addition funnel. This mixture was cooled in an ice bath and water (5 ml.) was added followed by the slow addition of 2,6-dimethoxy-3-chlorobenzoyl chloride (4.0 grams; 0.017 mole) prepared in Example 1. The ice bath was replaced by a heating mantle and the reaction mixture heated at reflux with continuous stirring for about 7 hours. After this time the reaction mixture was cooled and filtered. The filter-cake was triturated in hot chloroform and the triturate and filtrate were combined. The organic phase was separated from the aqueous phase, dried over magnesium sulfate, filtered and evaporated under aspirator pressure using a rotary evaporator. The residue, a white solid, was recrystallized from a toluene-chloroform-pentane mixture, washed with pentane and dried in a desiccator under vacuum to yield N,2,6-trimethoxy-3-chlorobenzamide having a melting point of 133–135° C. and having the following elemental analysis:

Analysis for $C_{10}H_{12}ClNO_4$.—Theory, percent: C, 48.88; H, 4.89; Cl, 14.46; N, 5.70. Found, percent: C, 48.52; H, 4.92; Cl, 14.40; N, 5.64.

Among the acarids which can be effectively controlled with the compound of the present invention are the red spider mite, the two spotted mite, the strawberry spider mite, the citrus rust mite, the citrus red mite, the European red mite, the cattle tick and the poultry mite.

For practical use as acaricides, the compound of this invention is generally incorporated into acaricidal compositions which comprise an inert carrier and an acaricidally toxic amount of such a compound. Such acaricidal compositions, which can also be called formulations, enable the active compound to be applied conveniently to the site of the acarid infestation in any desired quantity. These compositions can be solids such as dusts, granules, or wettable powders; or they can be liquids such as solutions, aerosols or emulsifiable concentrates.

For example, dusts can be prepared by grinding and blending the active compound with solid inert carriers such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 3

Preparation of a dust

N,2,6-trimethoxy-3-chlorobenzamide _____ 10
Powdered talc _____ 90

The above ingredients are mixed in a mechanical grinder-blender and are ground until a homogenous, free-flowing dust of the desired particle size is obtained. This dust is suitable for direct application to the site of the acarid infestation.

The compound of this invention can be applied as an acaricide in any manner recognized by the art. One method for destroying acarids comprises applying to the locus of the acarid infestation, an acaricidal composition comprising an inert carrier and as the essential active ingredient, in a quantity which is toxic to said acarids, the compound of the present invention. The concentration of the new compound of this invention in the acaricidal compositions will vary greatly with the type of formulation and the purpose for which it is designed, but generally the acaricidal compositions will comprise from about 0.05 to about 95 percent by weight of the active compond of this invention. In a preferred embodiment of this invention, the acaricidal compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compound of the present invention is also useful when combined with insecticides in the compositions heretofore described. These insecticides can comprise from about 5% to about 95% of the active ingredients in the compositions. Use of the combinations of these insecticides with the compound of the present invention provide acaricidal and insecticidal compositions which are effective in controlling acarids and inserts and often provide results unattainable with separate compositions of the individual components. The insecticides with which the compound of this invention can be used in the compositions to control insects, can include halogenated compounds such as DDT, methoxychlor, TDE, lindane, chlordane, isobenzan, aldrin, dieldrin, heptachlor, endrin mirex, endosulfon, dicofol, chlorobenzilate, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenethion, trichlorofon, DDVP, and the like; organic nitrogen compounds, such as dinitro-o-cresol, dinitrocyclohexylphenol, DNB, DNP, azobenzene, binapacril and the like; organic carbamate compounds such as carbaryl, ortho 5353 and the like; organic sulfur compounds such as phenothiazine, phenoxathin, lauryl thiocyanate, bis (2-thiocyanoethyl) ether, isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradi-chlorobenzene, and the like.

The new compound of this invention can be used in many ways for the control of acarids, for example, by spraying on plants on which the acarids feed. The quantity of active compound of this invention to be used for acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The utility of the compound of the present invention as an acaricide was determined in an experiment for the control of the two spotted spider mite by contacting said mite with the compound of this invention. In this experiment the test compound was formulated by dissolving it in acetone, and dispersing the solution in water containing small amounts of polyoxyalkylene derivatives of monolaurate and monooleate emulsifiers. The above formulation was then applied to plants infested with 50 to 100 adults of the mites and held for five days. Thereafter adult mortality was observed. Some of the results were as follows:

| Test chemical | Concentration of test chemical in p.p.m. | Percent mortality |
|---|---|---|
| N,2,6-trimethoxy-3-chlorobenzamide | 3,200 | 99 |
| Do | 1,000 | 72 |

Further utility of the compound of the present invention as an acaricide was shown in an experiment for the systemic control of the two spotted spider mite. In this experiment the test compound was dissolved in acetone and dispersed in water containing small amounts of polyoxyalkylene derivatives of monolaurate and monooleate emulsifiers. Five day old plants were watered with 30 ml. of 50 p.p.m. and 100 p.p.m. solutions of the test material. After 48 hours each plant was infested with 50 to 100 adults of the mites and held for five days. Thereafter adult mortality was observed. The results of this experiment are given below:

| Test chemical | Concentration of test chemical in p.p.m. | Percent mortality |
|---|---|---|
| N,2,6-trimethoxy-3-chlorobenzamide | 100 | 80 |
| Do | 50 | 78 |
| Control | | 0 |

We claim:
1. N,2,6-trimethoxy-3-chlorobenzamide.

References Cited

UNITED STATES PATENTS

| 3,187,042 | 6/1965 | Richter et al. | |
| 3,236,871 | 2/1966 | Himan et al. | 260—453 |
| 3,352,899 | 11/1967 | Taniguchi et al. | 260—453 |

CHARLES B. PARKER, Primary Examiner

S. T. LAWRENCE III, Assistant Examiner

U.S. Cl. X.R.

260—521, 544, 559; 424—298